United States Patent
Crumb et al.

(10) Patent No.: US 12,327,240 B2
(45) Date of Patent: Jun. 10, 2025

(54) METHOD AND APPARATUS FOR TOKENIZATION OF A NATURAL RESOURCE

(71) Applicant: ABAXX TECHNOLOGIES CORP., Christ Church (BB)

(72) Inventors: Joshua Crumb, Christ Church (BB); Andrew Fedak, Christ Church (BB); Christopher A. Wiklof, Everett, WA (US)

(73) Assignee: ABAXX TECHNOLOGIES CORP., Christ Church (BB)

( * ) Notice: Subject to any disclaimer, the term of this patent is extended or adjusted under 35 U.S.C. 154(b) by 766 days.

(21) Appl. No.: 17/167,002

(22) Filed: Feb. 3, 2021

(65) Prior Publication Data

US 2021/0233067 A1    Jul. 29, 2021

Related U.S. Application Data

(63) Continuation-in-part of application No. PCT/US2019/045158, filed on Aug. 5, 2019, and a
(Continued)

(51) Int. Cl.
*G06Q 20/36* (2012.01)
*G06Q 50/02* (2024.01)
*G06Q 50/18* (2012.01)

(52) U.S. Cl.
CPC ......... *G06Q 20/3678* (2013.01); *G06Q 50/02* (2013.01); *G06Q 50/184* (2013.01); *G06Q 2220/00* (2013.01)

(58) Field of Classification Search
CPC .. G06Q 20/3678; G06Q 50/02; G06Q 50/184; G06Q 2220/00; G06F 21/602; H04L 67/02

See application file for complete search history.

(56) References Cited

U.S. PATENT DOCUMENTS

| | | |
|---|---|---|
| 2015/0206106 A1 | 7/2015 | Yago |
| 2015/0324789 A1 | 11/2015 | Dvorak et al. |

(Continued)

FOREIGN PATENT DOCUMENTS

| | | |
|---|---|---|
| WO | 2017131929 A1 | 8/2017 |
| WO | 2018022891 A1 | 2/2018 |

OTHER PUBLICATIONS

Written Opinion issued by the Intellectual Property Office of Singapore in Application No. 11202101029R, dated Nov. 7, 2022, 6 pps.

(Continued)

*Primary Examiner* — Steven S Kim
*Assistant Examiner* — Karlyannie M. Garcia
(74) *Attorney, Agent, or Firm* — Panitch Schwarze Belisario & Nadel LLP

(57) ABSTRACT

A computer method for tokenizing a natural resource includes receiving, via a graphical user interface (GUI), data corresponding to proof of natural resource rights to explore for, produce, mine, and/or harvest a natural resource in a specified region by a first party. The method includes receiving, via the GUI, a digital signature from a first party assigning at least a portion of the natural resource rights to a first quantity of distributed ledger tokens. The method includes issuing, with the server computer, the first quantity of distributed ledger tokens, each of the distributed ledger tokens carrying a smart contract entitling the bearer to a fractional amount of the at least a portion of the natural resource rights and crediting, with the server computer, a second quantity of the issued distributed ledger tokens to the first party.

16 Claims, 4 Drawing Sheets

Related U.S. Application Data continuation-in-part of application No. PCT/US2019/045170, filed on Aug. 5, 2019.

(60) Provisional application No. 62/714,425, filed on Aug. 3, 2018, provisional application No. 62/714,456, filed on Aug. 3, 2018.

(56) References Cited

U.S. PATENT DOCUMENTS

| | | |
|---|---|---|
| 2016/0284033 A1 | 9/2016 | Winand et al. |
| 2017/0024817 A1 | 1/2017 | Wager et al. |
| 2017/0024818 A1* | 1/2017 | Wager ................... H04L 9/3234 |
| 2017/0103391 A1 | 4/2017 | Wilson, Jr. et al. |
| 2017/0372278 A1 | 12/2017 | Frolov et al. |
| 2018/0025442 A1 | 1/2018 | Isaacson et al. |
| 2019/0114707 A1* | 4/2019 | McSheehan .......... G06Q 20/381 |
| 2019/0303887 A1* | 10/2019 | Wright ................. H04L 9/3234 |
| 2020/0042989 A1* | 2/2020 | Ramadoss ............ G06Q 50/167 |
| 2020/0394652 A1* | 12/2020 | Youb ....................... G06F 21/64 |
| 2021/0241243 A1* | 8/2021 | Wiklof ............. G06Q 20/38215 |

OTHER PUBLICATIONS

International Preliminary Report on Patentability for International Application No. PCT/US2019/045170 dated Feb. 9, 2021, 11 pgs.
International Search Report and Written Opinion for International Application No. PCT/US2019/045170 dated Nov. 20, 2019, 13 pgs.
International Preliminary Report on Patentability for International Application No. PCT/US2019/045158 dated Feb. 9, 2021, 12 pgs.
International Search Report and Written Opinion for International Application No. PCT/US2019/045158 dated Nov. 21, 2019, 17 pgs.

* cited by examiner

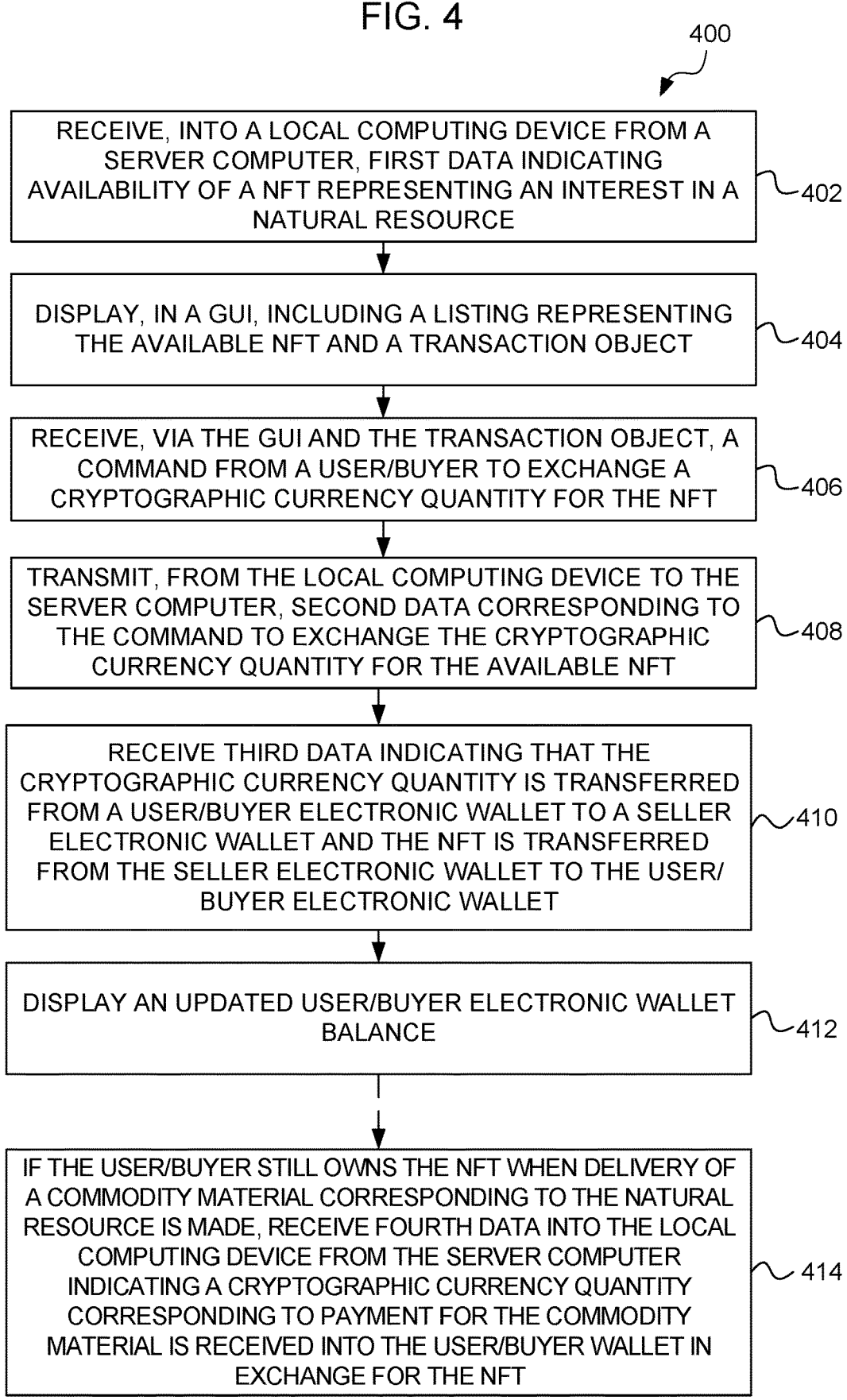

METHOD AND APPARATUS FOR TOKENIZATION OF A NATURAL RESOURCE

SUMMARY

According to an embodiment, a method for tokenizing a natural resource includes receiving, via a graphical user interface (GUI) into a server computer, data corresponding to proof of natural resource rights to prospect for, explore for, analyze, estimate, mine, process, refine, produce, and/or harvest a natural resource in a specified region by a first party. The method includes receiving, via the GUI into the server computer, a digital signature from the first party assigning at least a portion of the natural resource rights to a first quantity of distributed ledger tokens. The method includes issuing, with the server computer, the first quantity of distributed ledger tokens, each of the distributed ledger tokens carrying a smart contract entitling the bearer to a fractional amount of at least a portion of the natural resource rights, and crediting, with the server computer, a second quantity of the issued distributed ledger tokens to the first party by transferring the second quantity of the issued distributed ledger tokens to an electronic wallet owned by the first party. The method may include receiving, via the GUI into the server computer, one or more parameters corresponding to tokenization of the natural resource.

According to an embodiment, the method further includes administering, with the server computer, a distributed ledger exchange to swap at least a portion of the issued natural resource tokens for second natural resource tokens and/or for one or more cryptocurrencies.

According to an embodiment, a computer method for administering a natural resource transaction includes receiving, via a first graphical user interface (GUI) from a seller, an ask price for a quantity of a tokenized natural resource, denominated in a first currency, and receiving, via a second GUI from a buyer, a bid price for the quantity of the tokenized natural resource, denominated in a second currency. The computer method includes determining that the ask price and the bid price meet a match criterion. The computer method includes receiving a first digital bearer asset, cryptographic currency, and/or digital security transaction corresponding to the bid price from a buyer wallet into a transaction wallet, and transmitting a second digital bearer asset, cryptographic currency, and/or digital security transaction corresponding to the ask price from the transaction wallet to a seller wallet. The computer method includes issuing a distributed ledger token corresponding to the quantity of the tokenized natural resource, and transmitting the distributed ledger token to the buyer wallet.

According to an embodiment, a non-transitory computer-readable medium carries computer instructions to cause a computer to execute a method including receiving, via a first graphical user interface (GUI) from a seller, an ask price for a quantity of a natural resource, denominated in a first currency, and receiving, via a second GUI from a buyer, a bid price for the quantity of the natural resource, denominated in a second currency. The non-transitory computer-readable medium includes determining that the ask price and the bid price meet a match criterion. The non-transitory computer-readable medium includes receiving a first cryptographic currency, digital security financial instrument, and/or digital bearer asset transaction corresponding to the bid price from a buyer wallet into a transaction wallet, and transmitting a second digital financial instrument, or digital bearer asset, cryptographic currency, and/or digital security transaction corresponding to the ask price from the transaction wallet to a seller wallet. The non-transitory computer-readable medium includes issuing a distributed ledger token corresponding to the quantity of the natural resource, and transmitting the distributed ledger token to the buyer wallet.

According to an embodiment, a computer system includes a webserver configured to output a first graphical user interface (GUI) to a first device for a seller and to receive an ask price for a quantity of a natural resource. The webserver is further configured to output a second GUI to a second device for a buyer and to receive a bid price for the quantity of the natural resource. The computer system includes a server computer, operatively coupled to the webserver, and configured to determine that the ask price and the bid price meet a match criterion, to authorize first and second cryptographic currency and/or digitally securitized asset transactions to respectively transfer the ask price to the seller and receive the bid price from the buyer, and to transmit said authorizations to the webserver.

According to an embodiment, a computer method for obtaining an interest in a natural resource right or an instance of a commodity includes receiving, from a server computer via an internetwork into a local computing device, first data indicating an availability of a distributed ledger non-fungible token (NFT) representing an interest in a natural resource right and displaying, on an electronic display operatively coupled to the local computing device, a graphical user interface listing representing the available NFT. Upon receipt of a command from a buyer/user via the GUI, the local computing device transmits data to a server computer to cause exchange of an amount of a cryptographic currency from a user/buyer-controlled electronic wallet for the NFT from a seller-controlled wallet or a transaction wallet. The local computing device then receives data indicating that the swap of the cryptographic currency for the NFT has been made and displays, on the electronic display via the GUI, an updated user/buyer controlled electronic wallet balance including the NFT and a reduced amount of the cryptographic currency. If the user/buyer continues to own the NFT when the natural resource or corresponding commodity material is delivered to a physical buyer, the server may receive payment, convert the payment into a corresponding cryptographic currency quantity and swap the NFT from the user wallet for the corresponding cryptographic currency quantity, which is swapped into the electronic wallet controlled by the user. The local device may receive and display data indicating that the cryptographic currency quantity corresponding to payment for the natural resource or corresponding commodity material is credited to the user wallet, and the NFT swapped out of the user wallet.

BRIEF DESCRIPTION OF THE DRAWINGS

FIG. 4 is a flowchart showing a computer method for obtaining an interest in a natural resource or commodity material, according to an embodiment.

DETAILED DESCRIPTION

Figure 1:
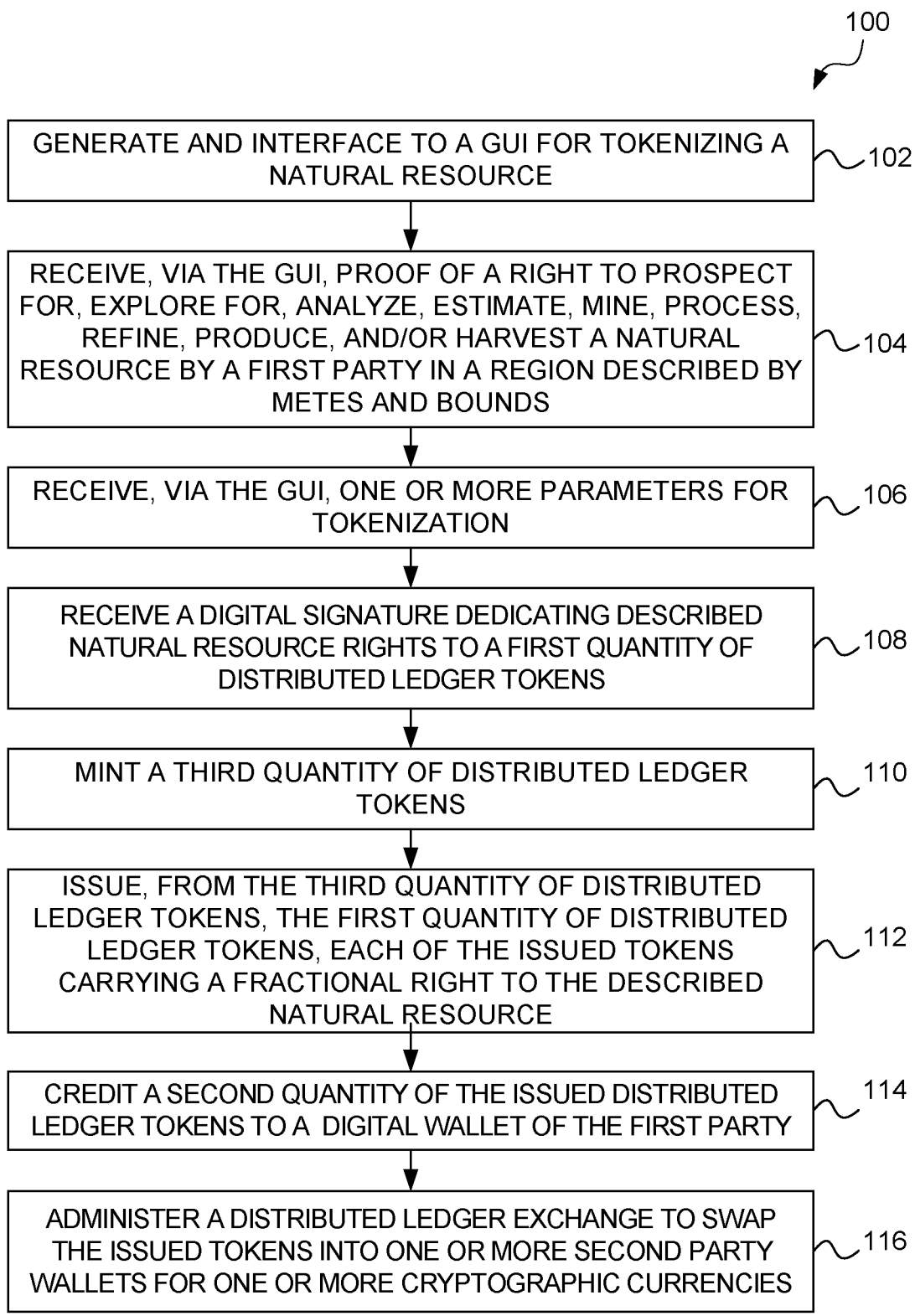
FIG. 1 is a flow chart showing a computer method for tokenizing a natural resource, according to an embodiment.

In the following detailed description, reference is made to the accompanying drawings, which form a part hereof. In the drawings, similar symbols typically identify similar components, unless context dictates otherwise.

Other embodiments may be used and/or other changes may be made without departing from the spirit or scope of the disclosure.

According to an embodiment, FIG. 1 is a flow chart showing a computer method 100 for tokenizing a natural resource. As used herein, the terms natural resource, commodity material, and rights thereto shall be considered synonymous, unless context indicates otherwise. For example, a natural resource may include an in-ground ore or natural gas deposit (or potential deposit which has not yet been identified) which a "seller" party desirous to tokenize holds rights to mine or drill for. Tokenizing the natural resource, or perhaps more accurately, tokenizing the rights to the natural resource, is contemplated by the inventors to provide a way for an operation to capitalize or fund a mining or drilling operation, and a way for an investor or consumer of a commodity produced under the rights to obtain reduced cost ownership, compared to buying produced material after mining or drilling. After production of the ore or natural gas, rights carried by a token relate to rights to or ownership of at least a fractional portion of the produced material. As the material is smelted or refined, the inventors contemplate that the ownership carried by the token may be transferred to the smelted or refined material, and so forth through a production, processing, and transportation chain. Alternatively, the smelter or refinery operator may choose to take ownership of the produced material, in which case the operator may take ownership by swapping a then current value of cryptographic currency or the like for the token from a party that holds the token.

As used herein, it is understood that token refers to a cryptographic token that may be transferred between electronic wallets according to blockchain or distributed ledger transactions. Because the token is not identical to other tokens representing rights to different natural resource or different instances of the same natural resource, it is considered a non-fungible token, or NFT. Embodiments described herein provide for a floating exchange rate swap of the NFT for a fungible exchange medium, such as a cryptographic currency. As will be made clear herein, the NFT may carry an electronic contract, such as a "smart contract", conveying rights to the underlying asset. As will also be understood, the inventors contemplate that the NFT may carry information or a link to information related to the underlying asset.

As used herein, the terms distributed ledger and blockchain will be considered synonymous unless context indicates otherwise.

According to an embodiment, a computer method 100 for tokenizing a natural resource includes, in step 104, receiving, via a graphical user interface (GUI) into a server computer, data corresponding to a proof of natural resource rights. For example, the data may include proof of a right to prospect for, explore for, analyze, estimate, mine, process, refine, produce, and/or harvest a natural resource in a specified region by a first party. The first party may be identified or authenticated, and may include at least the rights owner, an authorized affiliate and/or a licensee authorized to transfer the natural resource rights. Step 108 includes receiving, responsive to a command via the GUI into the server computer, a digital signature from the first party assigning at least a portion of the natural resource rights to a first quantity of distributed ledger tokens. Step 112 includes issuing, with the server computer, the first quantity of distributed ledger tokens. In an embodiment, each of the distributed ledger tokens carries an electronic contract (e.g., a "smart" contract) entitling the bearer or verified bearer to a fractional amount of at least a portion of the natural resource rights. I Step 114 includes crediting, with the server computer, a second quantity of the issued distributed ledger tokens to the first party by transferring the second quantity of the issued distributed ledger tokens to an electronic wallet owned by the first party. In an embodiment, the first quantity of distributed ledger tokens is greater than the second quantity, and the first quantity not included in the second quantity is credited to an issuer of the distributed ledger tokens. According to an embodiment, the first quantity of distributed ledger tokens is equal to the second quantity of distributed ledger tokens.

According to an embodiment, the computer method 100 includes, in step 102, generating the GUI for receiving and displaying information about natural resource rights and the tokenization thereof, and interfacing, in cooperation with a web server, with the GUI to drive displays in networked electronic devices. In an embodiment, interfacing with the GUI includes outputting one or more HTML pages on one or more electronic displays and receiving a user input corresponding via an input device associated with the one or more electronic displays. According to an embodiment, the input device may include a touch screen, a keyboard, a computer mouse, a digital pen, or the like. In another embodiment, interfacing with the GUI includes transmitting and receiving data to the GUI included in a downloaded application resident in a networked electronic device.

In an embodiment, receiving data corresponding to the proof of rights, in step 104, includes receiving a network address for access to an electronic instance (e.g., a portable document format (PDF), digital image, or the like) of an official document. Issuing the first quantity of distributed ledger tokens may include loading the network address and/or the electronic instance onto the distributed ledger.

In an embodiment, the natural resource rights, in step 104, include a right to explore for hydrocarbon deposits including a crude oil deposit and/or a natural gas deposit in a specified region. In an embodiment, the natural resource rights, in step 104, include a right to produce crude oil and/or natural gas from the specified region. In an embodiment, the natural resource rights, in step 104, include a permit to drill for oil and/or natural gas. In an embodiment, the natural resource rights, in step 104, include a right to mine shale oil and/or tar sands. In an embodiment, the natural resource rights, in step 104, include a right to fracture-produce ("frack") a known deposit. In an embodiment, the natural resource rights, in step 104, include a mining claim. In an embodiment, the natural resource rights, in step 104, include a public right to prospect for an ore. In an embodiment, the natural resource rights, in step 104, include a permit to operate and/or continue to operate a mine. In an embodiment, the natural resource rights, in step 104, include a right to conduct logging operations. Other natural resource rights and applications thereto will be clear to those having normal skill in the art.

According to an embodiment, the computer method 100 includes, in step 106, receiving, via the GUI into the server computer, one or more parameters corresponding to tokenization of the natural resource rights. In an embodiment, the one or more parameters, in step 106, include a quantity of distributed ledger tokens to be issued. In another embodiment, the one or more parameters, in step 106, include a limitation to the natural resource rights. In an embodiment, the one or more parameters, in step 106, include an exclusion of one or more natural resources comprehended by the proof of rights. For example, a right to produce natural gas and oil may exclude the oil from tokenization. In an embodiment, the one or more parameters, in step 106, may include a time limit, after which the token expires. In an embodiment, the one or more parameters, in step 106, include a par value of each token. In another embodiment, the one or more parameters include a distribution of proceeds from token sales. In an embodiment, the one or more parameters, in step 106, may include a limitation on transferability of the token. In an embodiment, the one or more parameters, in step 106, may include an environmental responsibility condition.

In an embodiment, the one or more parameters, in step 106, include one or more rules for distribution of proceeds arising from sale or transfer of material corresponding to the natural resource rights. In an embodiment, the one or more rules for distribution include a dividend denominated in a commodity token corresponding to a natural resource produced under the natural resource rights. In an embodiment, the one or more rules for distribution may include a dividend denominated in a cryptographic currency, fiat currency, or token(s) for a different natural resource-based commodity. In an embodiment, the one or more rules for distribution include a conversion of natural resource tokens into commodity tokens corresponding to production of a material corresponding to the natural resource rights. The natural resource token may be burned (rendered non-tradable) upon conversion.

In an embodiment, receiving a digital signature, in step 108, includes making a binding contract that transfers at least a portion of a value corresponding to the natural resource rights collectively to token holders.

According to an embodiment, the value may be a current realized value, a speculative value, or a prospective value.

According to an embodiment, the computer method 100, in step 110, further includes minting a third quantity of the distributed ledger tokens. In an embodiment, the third quantity is greater than the first quantity. In an embodiment, the minted distributed ledger tokens are blockchain tokens. In an embodiment, issuing the first quantity of distributed ledger tokens, in step 112, includes issuing the tokens with a contract that discloses the third quantity of minted tokens and sets forth conditions for issuance of additional distributed ledger tokens above and beyond the second quantity. In an embodiment, crediting the second quantity of issued distributed ledger tokens to the first party, in step 114, includes crediting an account of the first party on an exchange that issued the natural resource tokens. In an embodiment, the first quantity is greater than the second quantity.

According to an embodiment, the computer method 100 further includes receiving, into the server computer, data corresponding to an assessment or estimate of the natural resource value (not shown) and publishing the data onto the distributed ledger (not shown). In an embodiment, the data corresponding to the assessment of the natural resource value includes a digital representation of one or more of: a sonogram (image from a seismic imaging device), a core sample, an assay, a production rate, a production volume, and a drilling depth. In an embodiment, the first party is required by a contract carried by the distributed ledger to submit the data corresponding to the assessment of the natural resource value.

According to an embodiment, the computer method 100 further includes, in step 116, administering, with the server computer, a distributed ledger exchange to swap at least a portion of the issued natural resource tokens for second natural resource tokens (e.g., tokens corresponding to a different proved right) and/or for one or more cryptocurrencies. According to an embodiment, the issued natural resource tokens may be exchanged into one or more second party wallets for the one or more cryptocurrencies.

Figure 2:
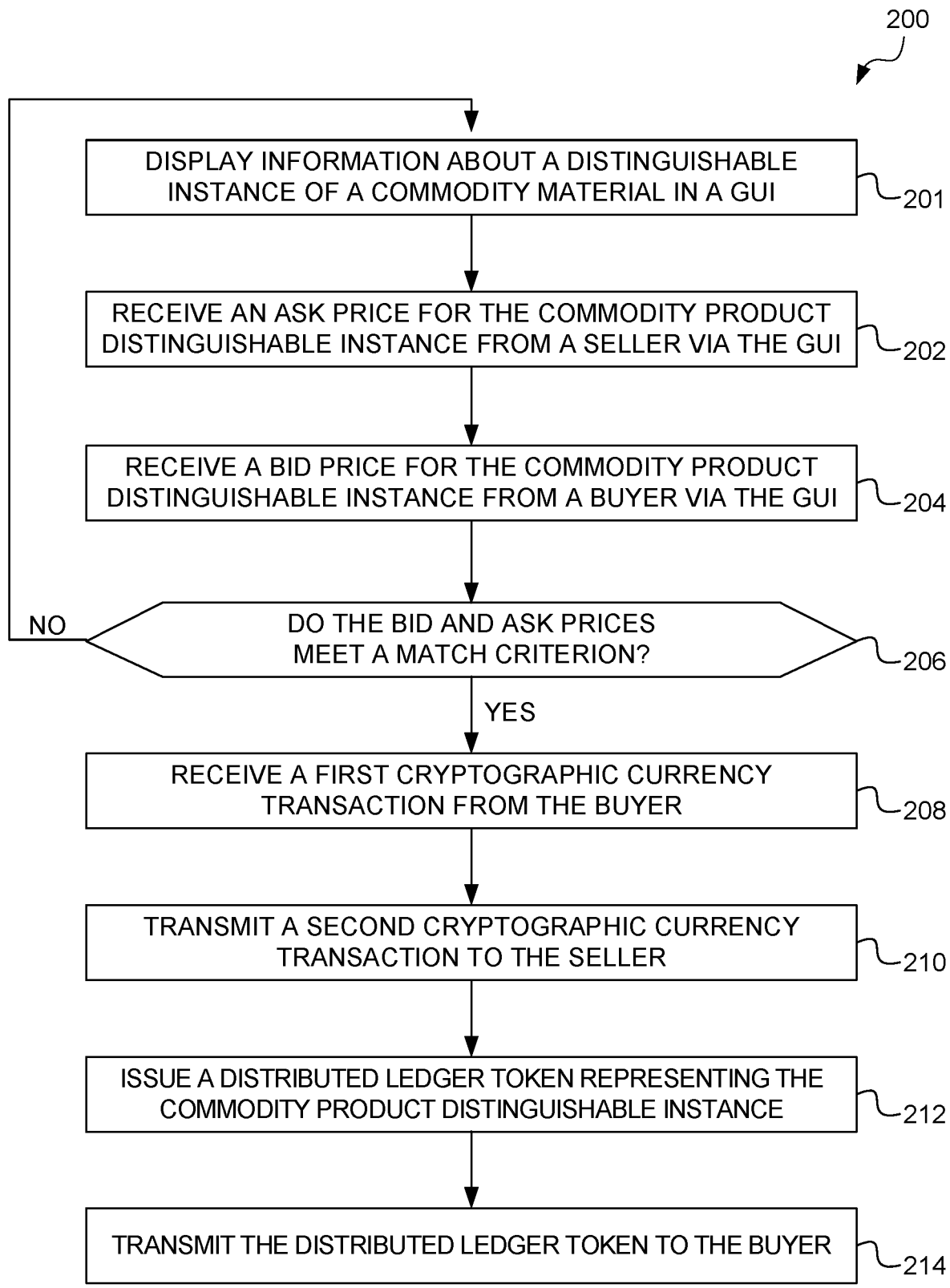
FIG. 2 is a flowchart showing a computer method for administering a natural resource transaction, according to an embodiment.

FIG. 2 is a flowchart showing a computer method 200 for administering a natural resource transaction, according to an embodiment. The computer method 200 may include several steps.

According to an embodiment, step 202 may include receiving, via a first graphical user interface (GUI) from a seller, an ask price for a quantity of a tokenized natural resource, denominated in a first currency.

According to an embodiment, step 204 may include receiving, via a second GUI from a buyer, a bid price for the quantity of the tokenized natural resource, denominated in a second currency.

According to an embodiment, step 206 may include determining whether or not the ask price and the bid price meet a match criterion. For example, according to an embodiment, if the bid price is greater than or equal to the ask price, it may be determined that the match criterion is met. In another embodiment, the match criterion may be determined as being met if the bid price is greater than a predetermined threshold amount below the ask price.

According to an embodiment, if it is determined, in step 206, that the ask price and the bid price meet the match criterion, step 208 may include receiving a first digital bearer asset, cryptographic currency and/or digital security transaction corresponding to the bid price from a buyer wallet into a transaction wallet.

According to an embodiment, step 210 may include transmitting a second digital bearer asset, cryptographic currency, and/or digital security transaction corresponding to the ask price from the transaction wallet to a seller wallet.

According to an embodiment, step 212 may include issuing a distributed ledger token corresponding to the quantity of the tokenized natural resource.

According to an embodiment, step 214 may include transmitting the distributed ledger token to the buyer wallet.

According to an embodiment, with reference to step 204, the first currency may include a fiat currency such as United States dollars. Additionally or alternatively, the first currency may include a cryptographic currency, digital security, and/or digital bearer asset. According to an embodiment, the second currency may include a different currency than the first currency. According to an embodiment, when the second currency is different from the first currency, a calculated or predetermined exchange rate may be applied. According to an embodiment, the second currency may include the same currency as the first currency.

According to an embodiment, the first GUI in step 202 and the second GUI in step 204 may include respective instances of the same GUI.

According to an embodiment, referring to FIG. 2, step 201 may include displaying, via the GUI to at least one of the seller or the buyer, information about a distinguishable instance of a commodity material. For example, step 201 may include displaying at least one benchmark price for the quantity of the tokenized natural resource. Additionally or alternatively, step 201 may include displaying, via the GUI to at least one of the seller or the buyer, at least one estimated price for the quantity of the tokenized natural resource. In another embodiment, step 201 may include displaying, via the GUI to at least one of the seller or the buyer, at least one historical price for the quantity of the tokenized natural resource. In another embodiment, step 201 may include displaying a currency exchange rate for accepted transaction currencies. In some implementations the currency exchange rate(s) may be a parameter provided in or with a token representing a quantity or value of the tokenized natural resource commodity.

According to an embodiment, with reference to step 206, determining that the ask price and the bid price meet a match criterion may include determining that the bid price is greater than or equal to the ask price plus a transaction fee.

According to an embodiment, if the ask price and the bid price do not match a criterion, the process may return to step 201, displaying, via the GUI, the benchmark price for the quantity of the tokenized natural resource.

According to an embodiment, with reference to step 208, receiving the first digital bearer asset, cryptographic currency, and/or digital security transaction from the buyer wallet into the transaction wallet may include receiving a fungible cryptographic currency and/or a digitally securitized asset. Additionally or alternatively, with reference to step 208, receiving the first digital bearer asset, cryptographic currency, and/or digital security transaction may include receiving a distributed ledger token corresponding to a quantity of a second tokenized natural resource different than the tokenized natural resource.

According to an embodiment, step 201 may include displaying a property of the tokenized natural resource in the GUI. In embodiments, the property may include a commodity grade, a physical property, an extrinsic property, an elemental analysis, and/or other properties that may affect a value of the natural resource. Additionally or alternatively, step 201 may include displaying price information about the commodity quantity in the GUI. According to an embodiment, with reference to step 201, displaying the price information may include displaying a price history for previous quantities of the tokenized natural resource. Additionally or alternatively, with reference to step 201, displaying the price information may include displaying a modeled price for the tokenized natural resource. For example, a modeled price may include an artificial intelligence (AI) generated price based on price changes in similar different natural resources or commodity prices descending therefrom. In another embodiment, a modeled price may account for changes in risk or completion of steps toward production of the natural resource. In another embodiment, a modeled price may account for global changes in supply or demand or changes in relative value of a cryptographic currency relative to real world values.

According to an embodiment, with reference to step 202, the quantity of tokenized natural resource may include a particular distinguishable instance of the natural resource and/or may include a generalized portion of the natural resource.

According to an embodiment, the natural resource may include in-situ minerals, metals, and hydrocarbon deposits. According to an embodiment, the quantity may include a ton or a metric tonne. According to an embodiment, the quantity may include a quantity of refined metal produced from the in-situ minerals, metals, and hydrocarbon deposits.

According to an embodiment, the natural resource may be produced (e.g., mined, harvested, butchered, refined, etc.) at a future date. According to an embodiment, the natural resource may exist in a transportable form at the moment of distributed ledger token issuance.

According to an embodiment, the natural resource may include mined ore or coal. Additionally or alternatively, the natural resource may include hydrocarbon deposits including oil and/or natural gas. In an alternative embodiment, the natural resource may include liquefied natural gas.

According to an embodiment, the quantity may include a number of standard cubic feet. Additionally or alternatively, the quantity may include a unit of mass. In an alternative embodiment, the quantity may include a unit of energy.

According to an embodiment, the natural resource may include a (e.g., an in-ground) portion of a natural gas deposit. Additionally or alternatively, the natural resource may include an agricultural product.

According to an embodiment, step 212 may further include receiving a second ask price for the distributed ledger token at a later date. The distributed ledger token may represent the same distinguishable instance of the natural resource as when the distributed ledger token was issued, according to an embodiment.

According to an embodiment, the method 200 may include receiving notice that the distinguishable instance of the natural resource is delivered as a distinguishable instance of a commodity material, receiving payment for the delivered commodity material, and redeeming the distributed ledger token for a currency corresponding to the received payment.

According to an embodiment, the distributed ledger token may be burned when redeemed. "Burning" the distributed ledger token refers to rendering the token permanently non-tradable. According to an embodiment, the value of the distributed ledger token may be reset to zero when redeemed. Additionally or alternatively, the value of the distributed ledger token may be set to equal the current value of the quantity of the natural resource. According to an embodiment, the distributed ledger token may be asset-backed by the distinguishable instance of the natural resource it is issued to represent.

According to an embodiment, a non-transitory computer-readable medium may be configured to store and permit processor access to computer instructions to cause a computer to execute the method 200 described above.

Figure 3:
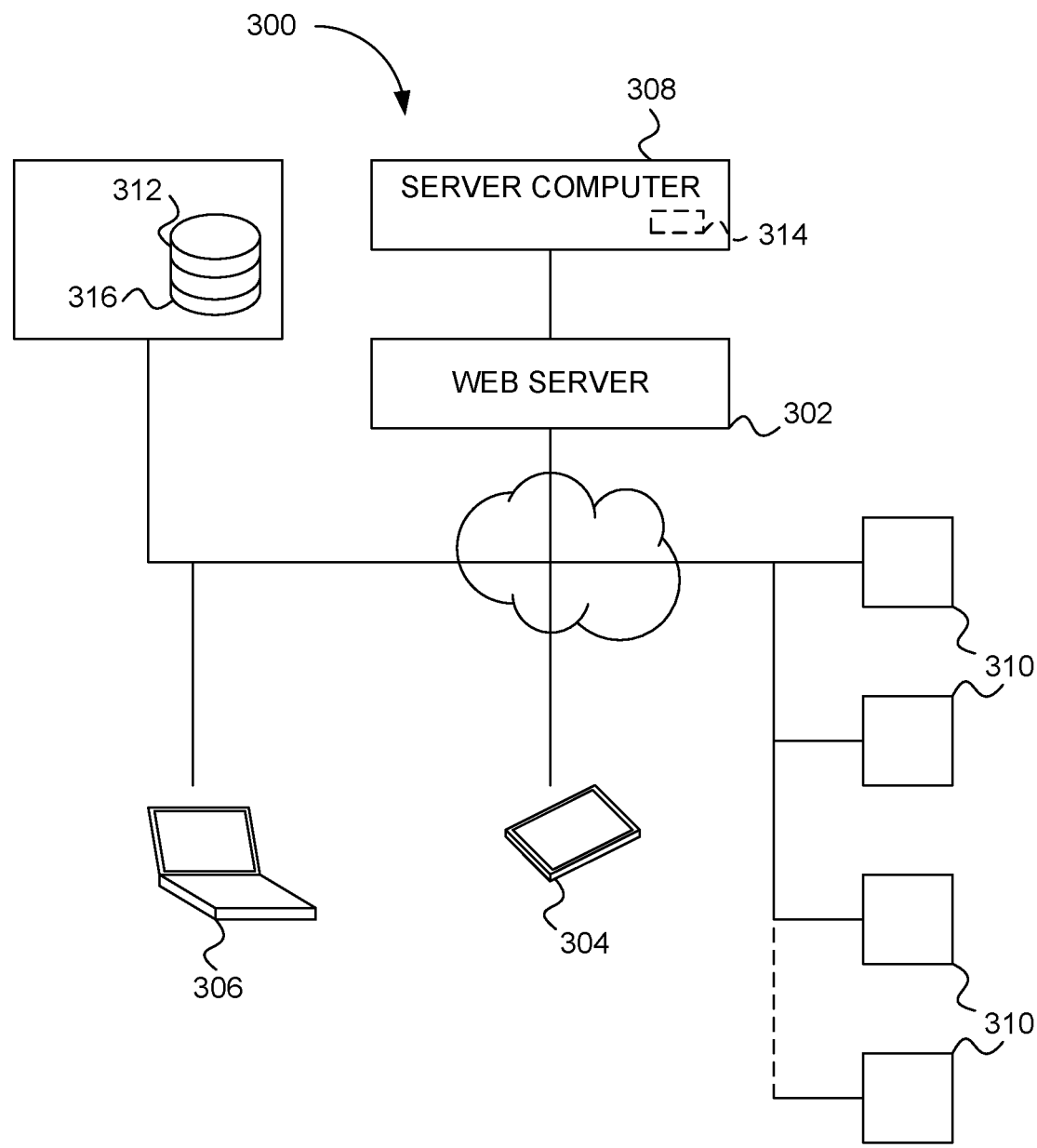
FIG. 3 is a block diagram of a computer system configured to administer a natural resource transaction, according to an embodiment.

FIG. 3 is a block diagram of a computer system 300 configured to administer a natural resource transaction, according to an embodiment.

According to an embodiment, the computer system 300 may include a webserver 302 configured to output a first graphical user interface (GUI) to a first device 304 for a seller and to receive an ask price for a quantity of a natural resource. The webserver 302 may be further configured to output a second GUI to a second device 306 for a buyer and to receive a bid price for the quantity of the natural resource, according to an embodiment. The computer system 300 may include a server computer 308, operatively coupled to the webserver 302, and configured to determine that the ask price and the bid price meet a match criterion, to authorize first and second cryptographic currency and/or digitally securitized asset transactions to respectively transfer the ask price to the seller and receive the bid price from the buyer, and transmit said authorizations to the webserver 302.

According to an embodiment, the computer system 300 may include a plurality of devices 310 operatively coupled to the webserver 302 and carrying the distributed ledger. The webserver 302 may be configured to transmit the authorized first and second cryptographic currency and/or digitally securitized asset transactions to the plurality of devices 310, according to an embodiment. The plurality of devices 310 may be configured to collectively validate the first and second cryptographic currency and/or digitally securitized asset transactions, according to an embodiment. The webserver 302 may be configured to receive and forward collective validation to the server computer 308, according to an embodiment.

According to an embodiment, the server computer 308 may be further configured to receive a first cryptographic currency and/or digitally securitized asset transaction corresponding to the bid price from a buyer wallet 312 to a transaction wallet 314 via the webserver 302. The server computer 308 may transmit a second cryptographic currency and/or digitally securitized asset transaction corresponding to the ask price from the transaction wallet 314 to a seller wallet 316 via the webserver 302, according to an embodiment. The server computer 308 may issue a distributed ledger token corresponding to the quantity of the natural resource, according to an embodiment. The server computer 308 may cause the webserver 302 to transmit the token to the buyer wallet 312.

FIG. 4 is a flowchart showing a computer method 400 for obtaining an interest in a natural resource right, according to an embodiment. In step 402, a local computing device receives, from a server computer via an internetwork, first data indicating an availability of a distributed ledger non-fungible token (NFT) representing an interest in a natural resource. Proceeding to step 404, the method 400 includes displaying, on an electronic display operatively coupled to the local computing device, a graphical user interface. The graphical user interface includes a listing representing the available NFT and a transaction object for receiving a command from a user to purchase the distributed ledger NFT. In step 406, a command to exchange a cryptographic currency quantity for the available NFT is received from the user via a user interface and the transaction object (the command being made by the user/buyer). In step 408, second data corresponding to the command to exchange the cryptographic currency quantity for the available NFT is transmitted from the local computing device to the server computer via the internetwork. An acceptance of the transmitted command is typically executed by the server, in some embodiments by a complementary transmission and receipt of data from a seller of the NFT. The server computer may proceed by processing a distributed ledger transaction to exchange the cryptographic currency quantity (or an amount reduced by a transaction fee) for the NFT between electronic wallets under control of the user and the seller, respectively.

The method 400 may proceed to step 410 which includes receiving, from the server computer via the internetwork, third data indicating that the cryptographic currency quantity is transferred from and the NFT is transferred to one or more electronic wallets controlled by the user. In some embodiments, the NFT is transferred into the same address (i.e., same wallet address) as the cryptographic currency is transferred from. In other embodiments, the cryptographic currency source address and the NFT destination address are different addresses. One way to organize separate transaction addresses is to use an add function to generate new addresses in a hierarchical deterministic electronic wallet or corresponding object with a hierarchy function.

Proceeding to step 412, a software program operating on the local computing device causes the graphical user interface to display an updated balance carried by the electronic wallet, the updated balance including a reduction in a cryptographic currency balance from the electronic wallet and an addition of the NFT to the electronic wallet.

According to embodiments, the NFT carries an electronic "smart" contract serving as proof of ownership of the interest in the natural resource. The proof of the transaction in which the user acquired the NFT is immutably carried in a distributed ledger or blockchain transaction.

In step 404, displaying, on the electronic display operatively coupled to the local computing device, the graphical user interface includes displaying an information request object for receiving a command to display information related to the electronic contract serving as the proof of ownership of the interest in the natural resource. The method 400 may include receiving and causing display of data corresponding to the information related to the electronic contract responsive to receiving actuation of the information request object and transmission of the activation to the server computer.

In some embodiments, the transaction object and the information request object are the same object. In this case, context may dictate which action, information request or transaction, is intended by the user. For example, a first actuation may retrieve information. A second actuation may indicate a command to purchase the NFT. Alternatively, the type of actuation (e.g., function-click, double-click, etc.) may determine how actuation of the object is interpreted.

In some embodiments, displaying the information includes displaying at least one of a history and a projected history of physical transactions related to the natural resource. E.g., the projected history may include a forecast delivery date, projected transportation stages from a present location to one or more delivery or intermediate delivery locations, a projected set of costs associated with delivery, and/or a projected realized price received for the natural resource. The inventors contemplate additional or reduced data may be included in the information, depending on aspects of the transaction. For example, the information may include a projected production date. In another example, the information may include completed physical steps associated with at least one of mining, production, harvest, concentration, refining, and transportation steps undergone by the natural resource. In another example, the information may include scheduled or estimated physical steps associated with at least one of mining, production, harvest, concentration, refining, transportation, and delivery steps to be performed pursuant to monetization of the natural resource.

Referring to the receiving and displaying of information in steps 402 and 404 may include receiving information read from the NFT. That is, the inventors contemplate that the NFT may carry or may link to information related to physical handling of the natural resource. For example, the NFT may carry data corresponding to at least one physical step corresponding to a future action indicated for economic monetization of the natural resource. In another example, the NFT may carry data corresponding to at least one physical step corresponding to a completed action made pursuant to economic monetization of the natural resource.

In an embodiment, receiving the first data indicating the availability of the distributed ledger non-fungible token includes receiving data indicating the availability of the distributed ledger non-fungible token representing a fractional value of at least a potential commodity material produced from within defined metes and bounds of an owned, claimed, or leased rights holding.

In an embodiment, causing the graphical user interface to display an updated balance carried by the electronic wallet in step 412 includes displaying at least partial content of a hierarchical deterministic (HD) wallet.

In an embodiment, receiving data corresponding to the information related to the electronic contract in step 404 includes receiving data fetched from a distributed file system. For example, receiving and causing display of data corresponding to the information related to the electronic contract includes receiving data fetched from a FileCoin server.

In an embodiment, receiving and causing display of data corresponding to the information related to the electronic contract in steps 402 and 404 includes receiving data referenced from a distributed ledger transaction carrying an encrypted storage location, wherein the local computing device or the server computer fetches the data from the encrypted storage location.

Accordingly, a computer system carrying valuable logistics and material information is made to be more failure and hacking resistant owing to distributed encrypted storage of the NFT, transactions, and information; and by retrieval of information from redundant storage nodes.

If the user/buyer continues to own the NFT when the natural resource or corresponding commodity material is delivered to a physical buyer, the server may receive payment for the delivered material, convert the payment into a corresponding cryptographic currency quantity and swap the NFT from the user wallet for the corresponding cryptographic currency quantity, which is swapped into the electronic wallet controlled by the user. As shown in step 414, the local device may receive and display data indicating that the cryptographic currency quantity corresponding to payment for the natural resource or corresponding commodity material is credited to the user wallet, and the NFT swapped out of the user wallet.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for tokenizing a natural resource, comprising:
generating, by a server computer, a graphical user interface (GUI);
interfacing, in cooperation with a web server, with the GUI to drive displays in networked electronic devices, wherein the interfacing includes communicating with the GUI included in a downloaded application resident in a networked electronic device;
receiving, via the GUI into the server computer, a network address that enables access to an image of an official document corresponding to proof of natural resource rights in a specified region by a first party;
receiving, responsive to a command via the GUI into the server computer, a digital signature from the first party assigning at least a portion of the natural resource rights to a first quantity of distributed ledger tokens;
issuing, with the server computer, the first quantity of the distributed ledger tokens, each of the distributed ledger tokens carrying a smart contract (i) that carries a link to information related to the natural resource and (ii) entitles the bearer to a fractional amount of at least a portion of the natural resource rights;
loading, by the server computer, the network address and/or the image of the official document onto a distributed ledger;
crediting, with the server computer, a second quantity of the distributed ledger tokens to the first party by transferring the second quantity of the distributed ledger tokens to an electronic wallet owned by the first party;
minting, by the server computer, a third quantity of the distributed ledger tokens, wherein issuing the first quantity of the distributed ledger tokens includes issuing the first quantity of distributed tokens with a contract that discloses the third quantity and sets forth conditions for issuance of additional distributed ledger tokens above and beyond the second quantity;
administering, with the server computer, a distributed ledger exchange and swapping at least a portion of the issued first quantity of the distributed ledger tokens for second natural resource tokens;
converting, by the server computer, the issued first quantity of the distributed ledger tokens into commodity tokens; and
upon conversion of the issued first quantity of the distributed ledger tokens into commodity tokens, burning the issued first quantity of the distributed ledger tokens.

2. The method for tokenizing a natural resource according to claim 1, further comprising:
receiving, via the GUI into the server computer, additional data corresponding to proof of natural resource rights that enables an individual to perform an action associated with the natural resource including prospecting for, exploring for, analyzing, estimating, mining, processing, reining, producing, and/or harvesting a natural resource; and
performing, at a future date, the action associated with the natural resource.

3. The method for tokenizing a natural resource according to claim 1,
wherein the first quantity of distributed ledger tokens is greater than the second quantity; and
wherein a first quantity not included in the second quantity is credited to an issuer of the distributed ledger tokens.

4. The method for tokenizing a natural resource according to claim 1, wherein the first quantity of distributed ledger tokens is equal to the second quantity of distributed ledger tokens.

5. The method for tokenizing a natural resource according to claim 1,
wherein issuing the first quantity of distributed ledger tokens includes loading the network address and/or the image onto the distributed ledger.

6. The method for tokenizing a natural resource according to claim 1, wherein the natural resource rights include at least one of:
a right to explore for hydrocarbon deposits including a crude oil and/or a natural gas deposit in the specified region;
a right to produce crude oil and/or natural gas from the specified region;
a right to drill for oil and/or natural gas;
a right to mine shale oil and/or tar sands;
a right to fracture-produce ("frack") a known deposit;
a mining claim;
a public right to prospect for an ore;
a permit to operate or continue to operate a mine; and
a right to conduct logging operations.

7. The method for tokenizing a natural resource according to claim 1, further comprising:
receiving, via the GUI into the server computer, one or more parameters corresponding to tokenization of the natural resource.

8. The method for tokenizing a natural resource according to claim 7, wherein the one or more parameters include a number of distributed ledger tokens to be issued.

9. The method for tokenizing a natural resource according to claim 1, wherein receiving the digital signature includes making a binding contract that transfers at least a portion of a realized value corresponding to the natural resource rights collectively to token holders.

10. The method for tokenizing a natural resource according to claim 1, wherein the third quantity is greater than the first quantity.

11. The method for tokenizing a natural resource according to claim 1, wherein the at least the first or the second distributed ledger tokens are blockchain tokens.

12. The method for tokenizing a natural resource according to claim 1, wherein crediting the second quantity of distributed ledger tokens to the first party includes crediting an account of the first party on an exchange that issued the natural resource tokens.

13. The method for tokenizing a natural resource according to claim 1, wherein the first quantity is greater than the second quantity.

14. The method for tokenizing a natural resource according to claim 1, further comprising:
   receiving, into the server computer, data corresponding to an assessment of the natural resource value; and
   publishing the data onto the distributed ledger associated with the first quantity of distributed ledger tokens.

15. The method for tokenizing a natural resource according to claim 14, wherein the data corresponding to the assessment of natural resource value comprises at least one of: a sonogram, a core sample, an assay, a production rate, a production volume, and a drilling depth.

16. The method for tokenizing a natural resource according to claim 14, wherein the first party is required by a contract carried by the distributed ledger to submit the data corresponding to the assessment of the natural resource value.

* * * * *